US007493072B2

(12) United States Patent
Sato et al.

(10) Patent No.: US 7,493,072 B2
(45) Date of Patent: Feb. 17, 2009

(54) IMAGE FORMING DEVICE, IMAGE FORMATION OPERATION CORRECTING METHOD, AND IMAGE FORMATION OPERATION CORRECTING PROGRAM

(75) Inventors: Kazuyuki Sato, Kanagawa (JP); Tadashi Shinohara, Kanagawa (JP); Shinji Kobayashi, Tokyo (JP); Takao Watanabe, Kanagawa (JP); Nobuyoshi Kaima, Tokyo (JP); Yuichiro Shukuya, Tokyo (JP); Yoshiaki Kawai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 100 days.

(21) Appl. No.: 11/564,653

(22) Filed: Nov. 29, 2006

(65) Prior Publication Data

US 2007/0122210 A1 May 31, 2007

(30) Foreign Application Priority Data

Nov. 30, 2005 (JP) ............................ 2005-346353
Nov. 1, 2006 (JP) ............................ 2006-298260

(51) Int. Cl.
*G03G 15/01* (2006.01)
*G03G 13/04* (2006.01)
*G03G 15/00* (2006.01)
*B41J 2/385* (2006.01)
*G01D 15/06* (2006.01)

(52) U.S. Cl. ....................... 399/301; 347/116; 347/132; 399/49

(58) Field of Classification Search .................. 399/49, 399/301; 347/116, 132, 235, 250
See application file for complete search history.

(56) References Cited

U.S. PATENT DOCUMENTS

| | | | | | |
|---|---|---|---|---|---|
| 5,309,182 | A | | 5/1994 | Mama et al. | |
| 5,376,994 | A | | 12/1994 | Mama et al. | |
| 5,621,221 | A | | 4/1997 | Shinohara et al. | |
| 5,737,665 | A | | 4/1998 | Sugiyama et al. | |
| 5,765,083 | A | | 6/1998 | Shinohara | |
| 5,875,380 | A | | 2/1999 | Iwata et al. | |
| 5,899,597 | A | | 5/1999 | Shinohara et al. | |
| 5,962,783 | A | | 10/1999 | Iwata | |
| 6,029,021 | A | * | 2/2000 | Nishimura et al. | 399/49 |
| 6,118,557 | A | | 9/2000 | Sugiyama et al. | |
| 6,128,459 | A | | 10/2000 | Iwata et al. | |
| 6,282,396 | B1 | | 8/2001 | Iwata et al. | |

(Continued)

FOREIGN PATENT DOCUMENTS

JP 2005-91901 4/2005

*Primary Examiner*—Sandra L Brase
(74) *Attorney, Agent, or Firm*—Oblon, Spivak, McClelland, Maier & Neustadt, P.C.

(57) ABSTRACT

In an image forming device, a correction unit corrects image formation operation based on a plurality of correction patterns. A pattern creation unit forms an electrostatic latent image of the correction patterns on a photoconductor and transferring the image to an intermediate transfer body to form the correction patterns thereon. A pattern detecting unit detects the correction patterns formed on the intermediate transfer body. A speed detecting unit detects a movement speed of the correction patterns on the intermediate transfer body are moved. A timing holding unit computes a set value of detection start timing for starting detection of each correction pattern to hold the set value. The correction unit is provided to determine, in advance of correcting image formation operation, a detection start timing based on the movement speed and the set value.

13 Claims, 7 Drawing Sheets

U.S. PATENT DOCUMENTS

| | | | |
|---|---|---|---|
| 6,295,435 | B1 | 9/2001 | Shinohara et al. |
| 6,380,960 | B1 | 4/2002 | Shinohara |
| 6,381,435 | B2 | 4/2002 | Shinohara et al. |
| 6,573,918 | B2 | 6/2003 | Shinohara et al. |
| 6,693,654 | B2 | 2/2004 | Shinohara |
| 6,704,035 | B2 | 3/2004 | Kobayashi et al. |
| 6,711,364 | B2 | 3/2004 | Shinohara |
| 6,949,896 | B2 | 9/2005 | Andoh et al. |
| 2003/0137577 | A1 | 7/2003 | Shinohara |
| 2004/0041896 | A1 | 3/2004 | Shinohara |
| 2005/0009351 | A1 | 1/2005 | Takahashi et al. |
| 2005/0042001 | A1 | 2/2005 | Shinohara et al. |
| 2005/0053388 | A1 | 3/2005 | Yokoyama et al. |
| 2005/0057209 | A1 | 3/2005 | Andoh et al. |
| 2005/0085945 | A1 | 4/2005 | Andoh et al. |
| 2005/0088505 | A1 | 4/2005 | Shinohara |
| 2005/0200689 | A1 | 9/2005 | Shinohara et al. |
| 2005/0275713 | A1 | 12/2005 | Kawai |

* cited by examiner

14

IMAGE FORMING DEVICE, IMAGE FORMATION OPERATION CORRECTING METHOD, AND IMAGE FORMATION OPERATION CORRECTING PROGRAM

BACKGROUND OF THE INVENTION

1. Field of the Invention

This invention relates to an image forming device, an image formation operation correction method, and an image formation operation correcting program in which a correction pattern is formed on an intermediate transfer body in advance of image formation and an image formation operation is corrected by detecting the correction pattern.

2. Description of the Related Art

In a conventional image forming device, image formation operation is suspended temporarily and various kinds of correction operation in image formation are performed. For example, the amount of color gap in image formation is corrected using an alignment correction pattern.

In the image forming device of this type, image formation operation is temporarily interrupted, and an additional stopping time for performing the various kinds of correction operation is needed before the image formation operation is resumed. Then, there is an increasing demand for reducing the stopping time for performing the various kinds of correction operation as much as possible, in order to accelerate the image formation.

Japanese Laid-Open Patent Application No. 2005-091901 discloses an image formation operation correcting method. In the case of this image formation operation correcting method, in order to reduce the stopping time, a plurality of correction patterns for various kinds of correction operation are continuously formed on an intermediate transfer body, and the plurality of correction patterns are detected continuously by sensors, without suspending the image formation operation.

According to the method of Japanese Laid-Open Patent Application No. 2005-091901, the plurality of correction patterns which should be detected, including a process control pattern, a blade curling prevention pattern, and an alignment correction pattern, are formed in proximity to each other on the intermediate transfer body. It is necessary that the correction patterns formed thereon are distinguished from each other and detected correctly.

However, in the method of Japanese Laid-Open Patent Application No. 2005-091901, fixed start timing for starting the detection of the correction patterns on the intermediate transfer body by using the sensors is set up beforehand. If a change in any of various image formation parameters, including image formation speed, image formation distance, and so on, occurs, the actual timing of the start of detection of the correction patterns by the sensors is shifted from the fixed start timing. Therefore, it is difficult to correctly detect the correction patterns by the sensors when a change in any of the image formation parameters occurs.

Namely, the plurality of correction patterns are formed continuously on the intermediate transfer body, and inevitably the difference between the blade curling prevention pattern and the alignment correction pattern is very small. For this reason, if the mounting positions of the sensors are shifted a little or the mounting positions of the sensors are adjusted finely, or if the image formation speed increases, the problem that the blade curling prevention pattern is accidentally detected at the position where the alignment correction pattern should be detected originally.

Or if the image formation speed increases, a part of the alignment correction pattern is not detected properly, and skipping of detection of the correction pattern may arise.

For this reason, as a result, failure in the color gap correction operation or incorrect correction of the amount of color gap may arise. And there is the problem that the quality of the output image will deteriorate.

The main cause of the above problems is that the difference between the blade curling prevention pattern and the alignment correction pattern is very small. Thus, a technically conceivable countermeasure to be taken to eliminate the main cause of the above problems is to widen the difference between these correction patterns.

However, taking such countermeasures is in contradiction with the demand for accelerating the image formation speed, and it will not be a realistic solution to the above problems.

SUMMARY OF THE INVENTION

According to one aspect of the invention, there is provided an improved image forming device in which the above-described problems are eliminated.

According to one aspect of the invention there is provided an image forming device in which the demand for accelerating the image formation speed is satisfied and various kinds of correction operation can be performed efficiently without failure or error.

In an embodiment of the invention which solves or reduces one or more of the above-mentioned problems, there is provided an image forming device which transfers an electrostatic latent image formed on a photoconductor according to input image information, to an intermediate transfer body, and forms an output image, the image forming device comprising: a correction unit correcting image formation operation based on a plurality of correction patterns: a pattern creation unit forming an electrostatic latent image of the correction patterns on the photoconductor and transferring the electrostatic latent image to the intermediate transfer body to form the correction patterns thereon; a pattern detecting unit detecting the correction patterns formed on the intermediate transfer body by the pattern creation unit; a speed detecting unit detecting a movement speed at which the correction patterns formed on the intermediate transfer body are moved; and a timing holding unit computing a set value of detection start timing for starting detection of each of the correction patterns by the pattern detecting unit, to hold the computed set value, wherein the correction unit is provided to determine, in advance of correcting image formation operation based on the correction patterns, a detection start timing based on the movement speed detected by the speed detecting unit and the set value held by the timing holding unit.

In an embodiment of the invention which solves or reduces one or more of the above-mentioned problems, there is provided an image formation operation correcting method which corrects image formation operation of an image forming device which transfers an electrostatic latent image formed on a photoconductor according to input image information, to an intermediate transfer body, and forms an output image, the image formation cooperation correcting method comprising the steps of: correcting image formation operation based on a plurality of correction patterns; forming an electrostatic latent image of the correction patterns on the photoconductor and transferring the electrostatic latent image to the intermediate transfer body to form the correction patterns thereon; detecting the correction patterns formed on the intermediate transfer body; detecting a movement speed at which the correction patterns formed on the intermediate transfer body are moved;

and computing a set value of detection start timing for starting detection of each of the correction patterns in the detecting step, to hold the computed set value, wherein, in advance of correcting image formation operation based on the correction patterns, a detection start timing is determined based on the movement speed and the set value.

In the image forming device and the image formation operation correcting method of the invention, the movement speed of the correction patterns formed on the intermediate transfer body is detected. The detection start timing for detecting the correction patterns from the intermediate transfer body is determined with high precision based on the detected movement speed. It is possible to correctly detect the correction patterns, and the demand for accelerating the image formation speed is satisfied and various kinds of correction operation are performed efficiently without failure or error. Therefore, according to the image forming device and the image formation operation correcting method of the invention, it is possible to form the output image with high quality.

BRIEF DESCRIPTION OF THE DRAWINGS

Other objects, features and advantages of the present invention will be apparent from the following detailed description when reading in conjunction with the accompanying drawings.

DETAILED DESCRIPTION OF PREFERRED EMBODIMENTS

A description will be given of embodiments of the invention with reference to the accompanying drawings.

Figure 1:
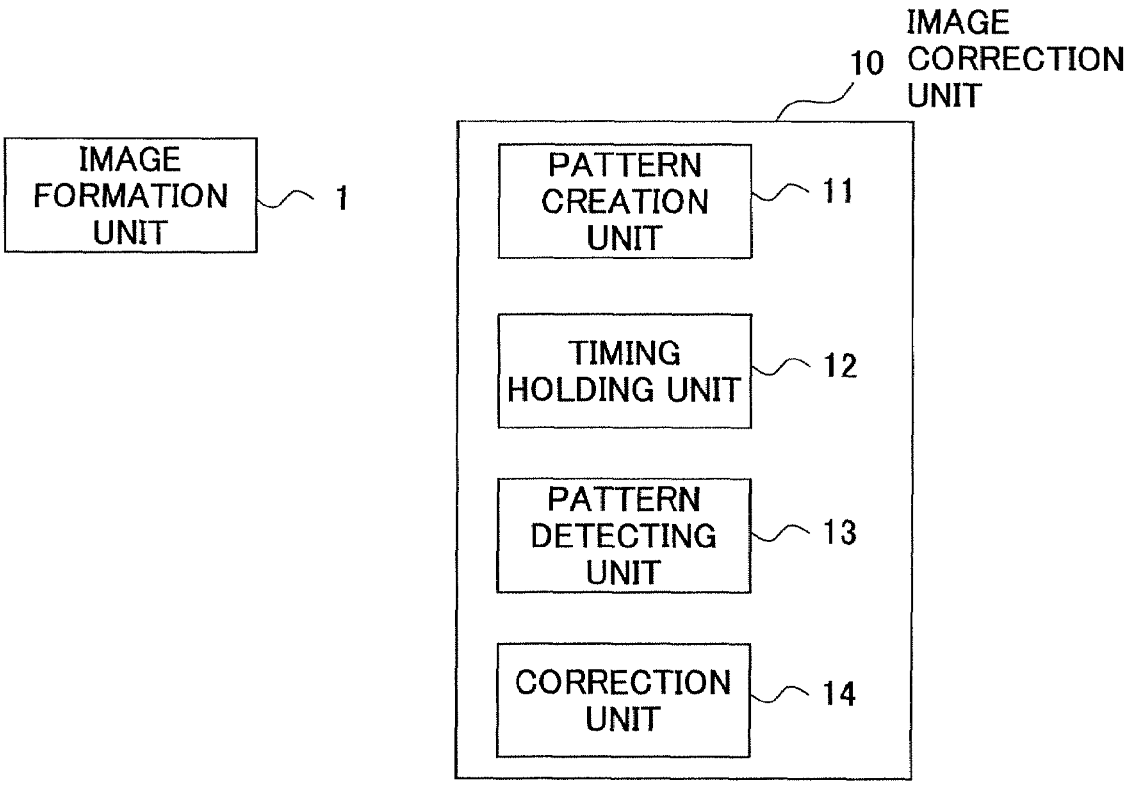
FIG. 1 is a block diagram showing the functional composition of the image forming device in an embodiment of the invention.

FIG. 1 shows the functional composition of the image forming device in an embodiment of the invention.

As shown in FIG. 1, the image forming device is provided with an image formation unit 1 and an image correction unit 10.

The image formation unit 1 inputs image information, makes a surface of a photoconductor exposed to light in accordance with the image information, and transfers an electrostatic latent image formed on the photoconductor to an intermediate transfer body, so that an output image is formed.

The image correction unit 10 performs various kinds of correction to image formation operation when the output image is formed by the image formation unit 1.

The image correction unit 10 comprises a pattern creation unit 11, a timing holding unit 12, a pattern detecting unit 13, and a correction unit 14.

In the image correction unit 10, the pattern creation unit 11 forms the electrostatic latent image of a plurality of correction patterns, corresponding to various kinds of correction operation to image formation operation of the image formation unit 1, on the photoconductor of the image formation unit 1. The pattern creation unit 11 transfers the electrostatic latent image to the intermediate transfer body and forms the plurality of correction patterns on the intermediate transfer body.

The pattern detecting unit 13 detects the correction patterns which are formed on the intermediate transfer body by the pattern creation unit 11.

The timing holding unit 12 computes a set value of detection start timing for starting operation of the pattern detecting unit 13 to detect the correction patterns, and holds the computed set value in the memory.

The timing holding unit 12 computes the set value of the detection start timing based on the period from the time of starting image formation operation to form the electrostatic latent image of each correction pattern on the photoconductor to the time of arriving at the position where each correction pattern formed on the intermediate transfer body is detected by the pattern detecting unit 13.

The pattern detecting unit 13 causes the pattern detection operation of detecting the plurality of correction patterns to start in accordance with the set value of the detection start timing held by the timing holding unit 12.

The correction unit 14 corrects image formation operation of the image formation unit 1 based on the plurality of correction patterns detected by the pattern detecting unit 13.

The correction unit 14 includes a speed detecting unit which detects the movement speed at which the plurality of correction patterns formed on the intermediate transfer body are moved.

The correction unit 14 determines, before correcting the image formation operation based on the plurality of correction patterns, detection start timing for starting detection of the correction patterns based on the movement speed detected by the speed detecting unit and the set value held by the timing holding unit 12.

In this manner, the timing holding unit 12 computes the set value of detection start timing based on the period from the time of forming the electrostatic latent image of the correction patterns on the photoconductor to the time of starting the detection of the correction patterns on the actual intermediate transfer body, and holds the computed set value in the memory. The correction unit 14 determines the detection start timing based on the movement speed of the correction patterns detected by the speed detecting unit and the set value held by the timing holding unit 12.

Therefore, even when the plurality of correction patterns, continuously formed on the intermediate transfer body, are detected, the correction patterns can be detected correctly, and various kinds of correction operation can be performed efficiently without failure or error. According to the image forming device of this embodiment, it is possible to form the output image with high quality.

Figure 2:
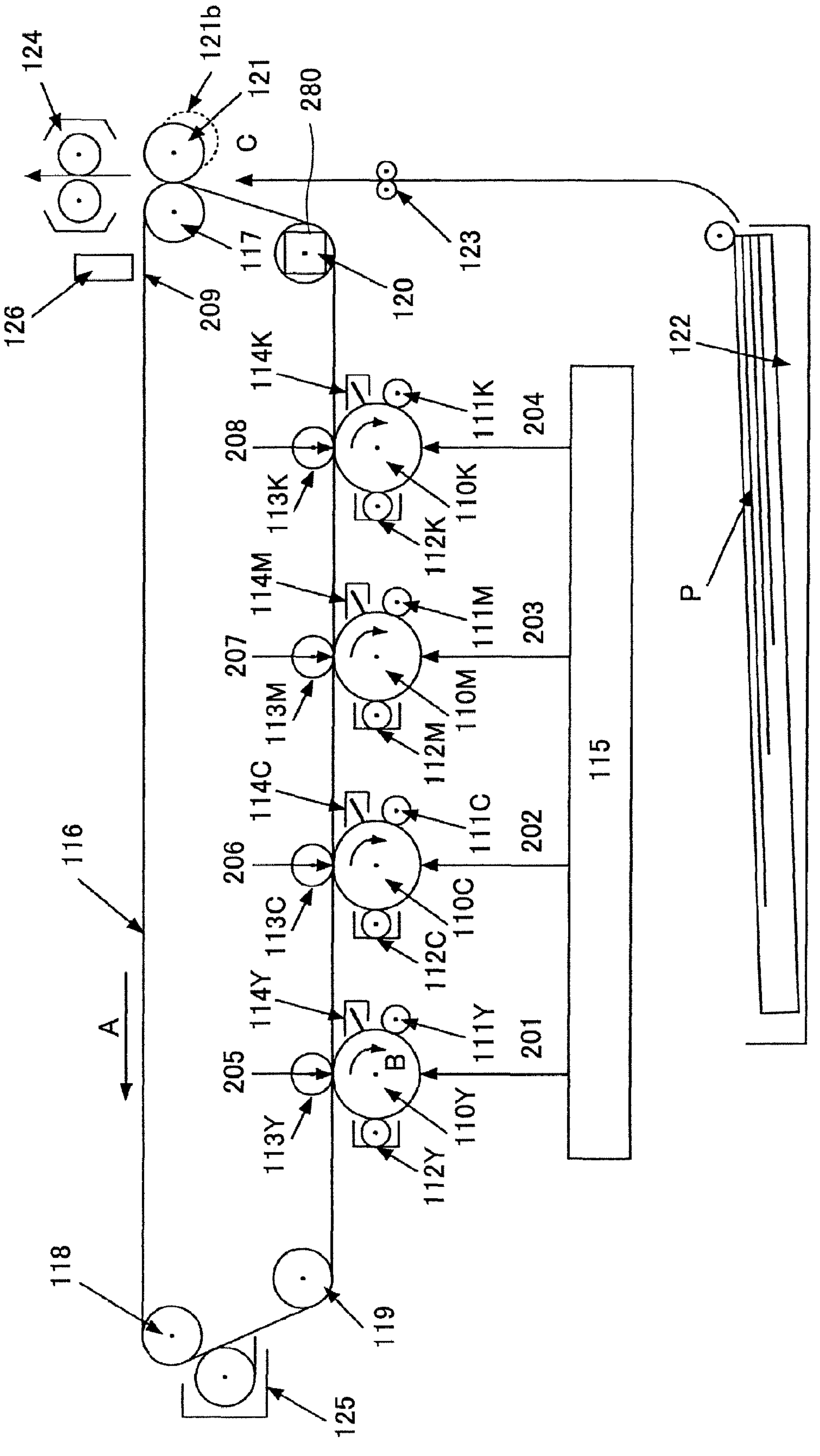
FIG. 2 is a block diagram showing the composition of an image formation unit provided in the image forming device in an embodiment of the invention.

FIG. 2 shows the composition of the image formation unit 1 provided in the image forming device in an embodiment of the invention.

This image forming device is an example of a tandem-type color image forming device in which an intermediate transfer body is adopted.

The image formation unit 1 is provided with four photoconductor drums 110Y, 110M, 110C, and 110K, four developing units 112Y, 112M, 112C, and 112K each of which develops the electrostatic latent image formed on each photoconductor drum into a toner image of a mutually different color, respectively, and an intermediate transfer belt 116 which is an image supporting body to which the toner images of different colors are primarily transferred in an overlapping state, respectively. The intermediate transfer belt 116 is an endless belt which is rotated and moved in the rotating direction indicated by the arrow A in FIG. 2.

The four photoconductor drums 110 for respective colors of yellow, cyan, magenta, and black (Y, C, M, K) are arranged in parallel along the rotating direction on the bottom-side surface of the intermediate transfer belt 116, respectively. The charging unit 111, the developing unit 112, the primary transfer roller 113 which constitutes the primary transfer device, and the cleaning device 114 are arranged on the periphery of each photoconductor drum 110, respectively. Each photoconductor drum 110 is rotated in the rotating direction indicated by the arrow B in FIG. 2.

During the rotation of the photoconductor drum 110, the surface of the photoconductor drum 110 is charged in a predetermined polarity by the charging unit 111. Subsequently, the laser beam from the optical writing unit 115 is emitted to the charged surface of the photoconductor drum 110, and an electrostatic latent image is formed on the surface of the photoconductor drum 110. This electrostatic latent image is visualized to a toner image of each color by the developing unit 112.

Each primary transfer roller 113 is arranged to confront the corresponding photoconductor drum 110, respectively. The intermediate transfer belt 116 is inserted between the primary transfer roller 113 and the photoconductor drum 110, and this intermediate transfer belt 113 is rotated in such inserted conditions.

The intermediate transfer belt 116 is supported by the plurality of support rollers 117-120. The toner image visualized on each photoconductor drum 110 is transferred to the surface of the intermediate transfer belt 116 by the action of the primary transfer roller 113. In this manner, the toner images of yellow, cyan, magenta, and black are one by one transferred in the overlapping state to the intermediate transfer belt 116, so that a full-color image is formed thereon.

In this embodiment, a rotary encoder 280 is attached to the rotating shaft (driven shaft) of the support roller 120. The rotary encoder 280 is rotated in synchronization with the rotation of the support roller 120, and this rotary encoder 280 is provided to detect the movement speed of the intermediate transfer belt 116.

This rotary encoder 280 is used when performing the process control and the rotary encoder 280 functions as a speed detecting unit which detects the movement speed of the correction pattern formed on the intermediate transfer belt 116.

The speed detecting unit provided in the image forming device is not limited to this rotary encoder 280. Alternatively, it may be constituted by a sensor which is directly attached to the intermediate transfer belt 116, and detects the movement speed of the intermediate transfer belt 116.

On the other hand, the secondary transfer roller 121 is arranged on the intermediate transfer belt 116 so that the intermediate transfer belt 116 is interposed between the secondary transfer roller 121 and the support roller 117 which are countered to each other.

When the plain paper P which is a recording medium is fed from the sheet feeding unit 122, the plain paper P is delivered at a predetermined timing, by the rotation of the registration roller pair 123, to the position between the support roller 117 and the secondary transfer roller 121 as indicated by the arrow C in FIG. 2. At this time, the color image currently supported by the intermediate transfer belt 116 is transferred to the plain paper P by the secondary transfer roller 121. The toner image is fixed to the plain paper P through heat and pressure by the fixing unit 124. The plain paper P is ejected to the paper output tray which is not illustrated. The remaining toner which adheres to the surface of the intermediate transfer belt 116 after the secondary transfer of the toner image is removed by the cleaning device 125.

The detection sensor unit 126 is arranged on the intermediate transfer belt 116 so that the detection sensor unit 126 can detect various kinds of correction patterns formed on the intermediate transfer belt 116.

Figure 3:
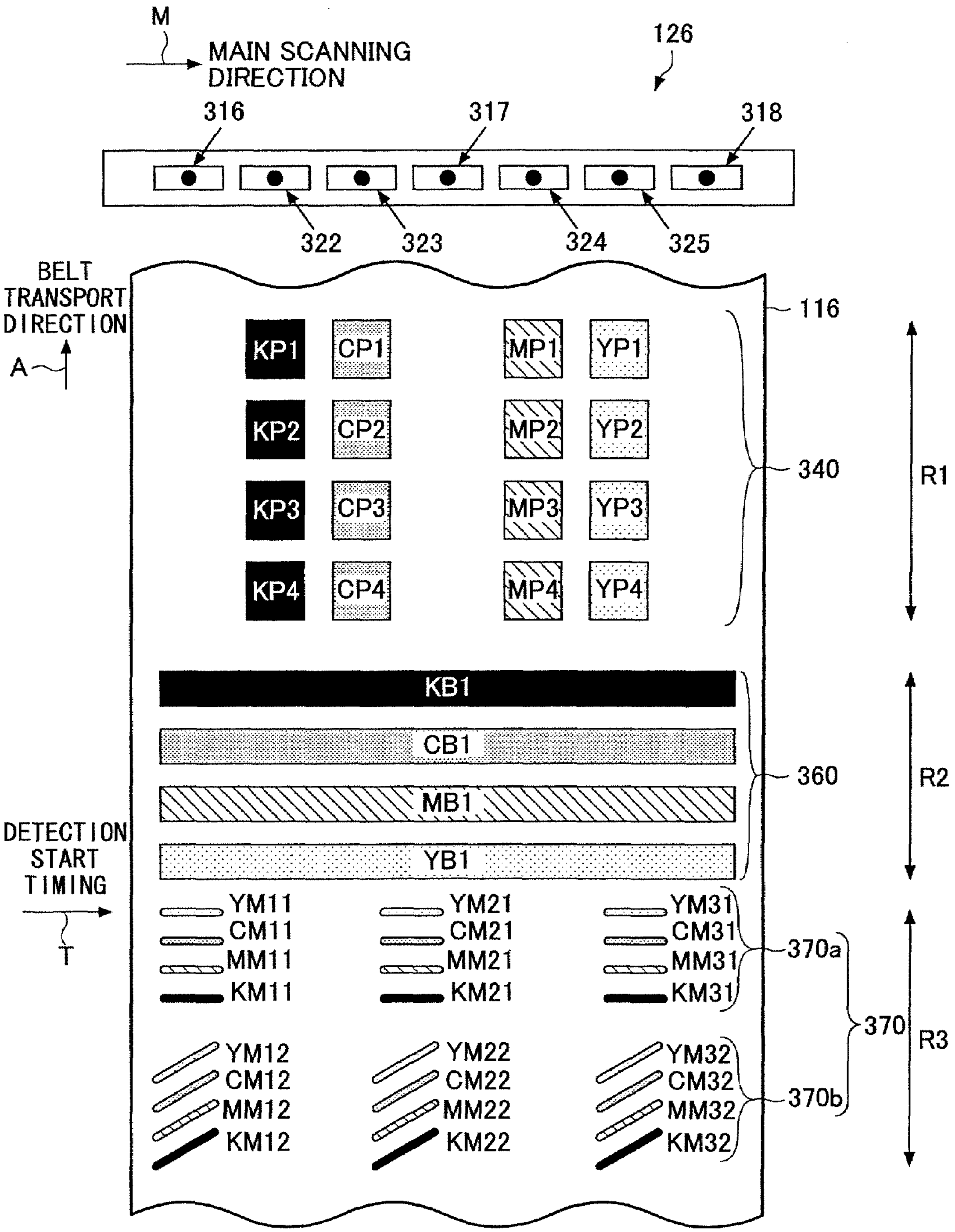
FIG. 3 is a diagram for explaining the way the detection sensors detect the correction patterns formed on the intermediate transfer belt.

FIG. 3 is a diagram for explaining the way the detection sensors detect the correction patterns formed on the intermediate transfer belt.

A plurality of correction patterns which include a process control pattern 340, a blade curling prevention pattern 360, and an alignment correction pattern 370 are continuously formed on the intermediate transfer belt 116.

Namely, in the example of FIG. 3, the process control pattern 340, the blade curling prevention pattern 360, and the alignment correction pattern 370 are continuously formed in three continuous pattern formation regions R1, R2, and R3 of the intermediate transfer belt 116, respectively.

The alignment correction pattern 370 of the pattern formation region R3 includes a sub-scanning-direction alignment correction pattern 370*a* and a main-scanning-direction alignment correction pattern 370*b*.

As mentioned above, in order to form a plurality of correction patterns continuously on the intermediate transfer belt 116, the distance between the blade curling prevention pattern 360 and the alignment correction pattern 370 (namely, the distance between the formation regions R2 and R3) becomes inevitably very small.

For this reason, if the mounting positions of the sensors are shifted a little, or the mounting positions are adjusted finely, or if the image formation speed increases, the conventional image forming device has the problem that the blade curling prevention pattern 360 is accidentally detected at the position where the alignment correction pattern 370 should be detected originally. Or if the image formation speed increases, a part of the alignment correction pattern 370 is not detected properly, and skipping of detection of the correction pattern may arise.

For this reason, as a result, failure in the color gap correction operation or incorrect correction of the amount of color gap may arise. And there is the problem that the quality of the output image will deteriorate.

To obviate the problem, the image forming device of this embodiment is configured to correctly determine the detection start timing (as indicated by the arrow T in FIG. 3) for starting detection of the alignment correction pattern 370.

In the detection sensor unit 126, the sensors 322, 323, 324, and 325 are arranged for detecting the process control pattern. The sensors 322, 323, 324, and 325 are arranged to detect respective process control patterns KP, CP, MP, and YP which are formed in parallel in the respective colors. The correction unit 14 performs various kinds of process control operation based on the information including the optical density of the detected process control pattern 340.

Moreover, in the detection sensor unit 126, the alignment correction pattern detection sensors 316, 317, and 318 are arranged along the main scanning direction indicated by the arrow M in FIG. 3. Specifically, the alignment correction pattern detection sensors 316, 317, and 318 are arranged to detect, at the three positions, the corresponding alignment correction patterns KM1x, CM1x, MM1x, YM1x, KM2x, CM2x, MM2x, YM2x, KM3x, CM3x, MM3x, and YM3x.

When performing the process control correction, the correction unit 14 performs a predetermined operation based on the detection results of the correction pattern by the pattern detecting unit 13, and corrects the process control conditions, such as charging, developing, and transferring conditions.

When performing the alignment correction, the correction unit 14 is adapted to detect the skew to the reference color (in this case, K), the sub-scanning registration gap, the main-scanning registration gap, and the main-scanning scaling error. The correction unit 14 is adapted to perform the alignment correction so that the amount of color gap by the scaling deflection in the main scanning direction is made inconspicuous by shifting the image in the reverse direction opposite to the direction of deviation by one half of the maximum amount of deviation detected by the sensors.

Since the alignment correction pattern detection sensors 316, 317, and 318 also detect a scanning line curving by detecting the three points, the correction unit 14 is adapted to optimize the sub-scanning registration correction.

The computation of the amounts of color gaps and the correction amounts and the output of the correction request instruction by the correction unit 14 are carried out by the CPU (refer to the CPU 445 of FIG. 4 which will be mentioned later).

The alignment correction and process control correction by the correction unit 14 may be executed by the command inputted by the user from the user menu, the service menu, or the printer driver of the image forming device. Alternatively, it may be automatically executed when a predetermined execution judgment condition (for example, the time of power up of the device, the number of accumulated print sheets, or a temperature rise of the part in the device which is not illustrated) is met.

Figure 4:
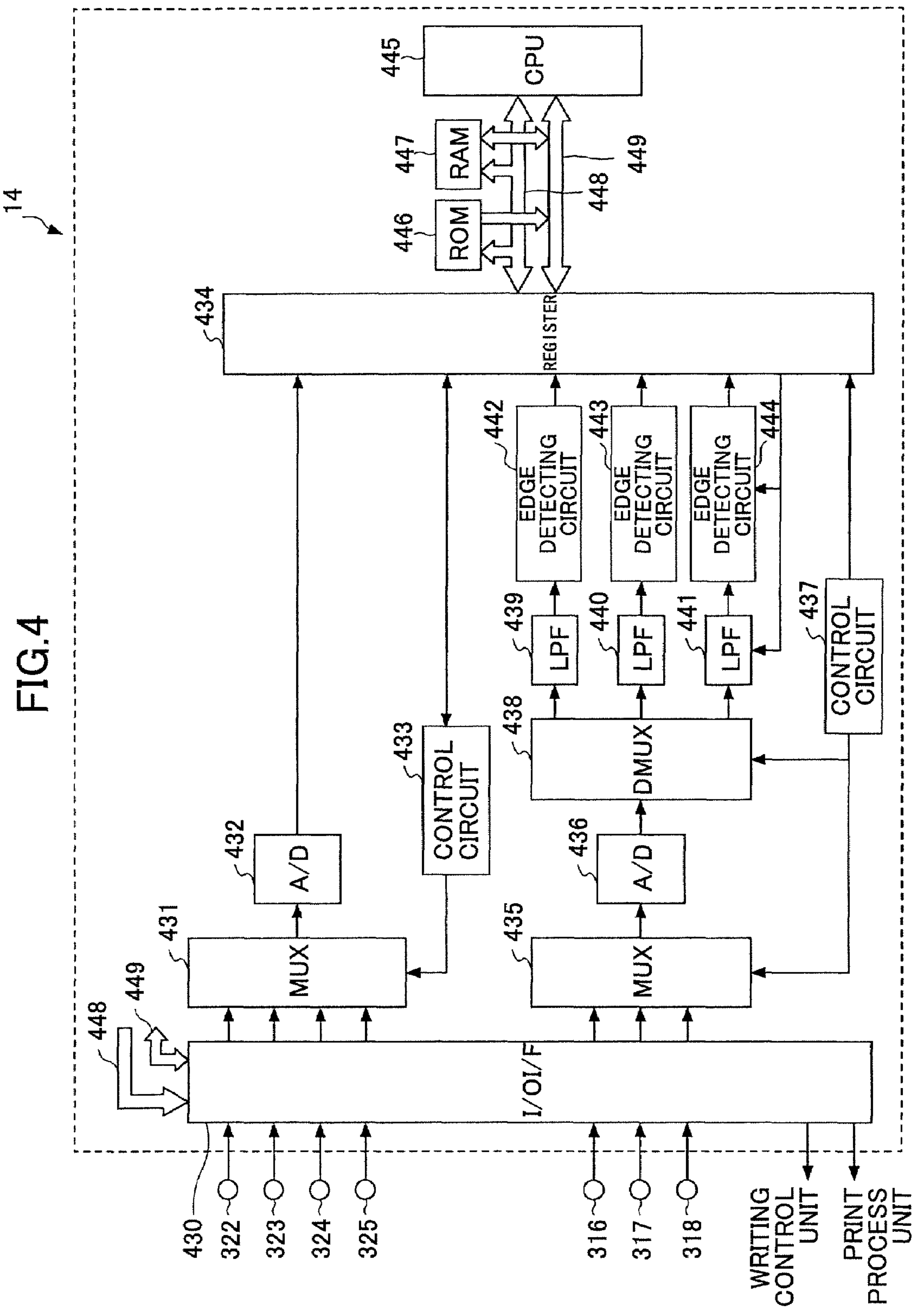
FIG. 4 is a block diagram showing the composition of a correction unit of an image correction unit provided in the image forming device in an embodiment of the invention.

FIG. 4 is a block diagram showing the composition of the correction unit 14. Operation of the process control and alignment correction control by the correction unit 14 will be explained with reference to FIG. 4.

As shown in FIG. 4, the detection voltage signals of the process control pattern detection sensors 322, 323, 324, and 325 are inputted to the multiplexer 431 via the input/output interface (I/O I/F) 430.

The multiplexer 431 and the A/D converter 432 are controlled by the control circuit 433 to perform the selection of the sensor channel and the A/D-conversion operation only during correction pattern formation. And the digital data acquired after the A/D conversion is stored in the register 434. Based on the stored data, the CPU 445 changes the process conditions, such as charging conditions, developing conditions, and transferring conditions.

The detection voltage signals of the alignment correction pattern detection sensors 316, 317 and 318 are inputted to the multiplexer 435 via the input/output interface 430. The multiplexer 435 and the A/D converter 436 are controlled by the control circuit 437 to perform the selection of the sensor channel and the A/D-conversion operation only during pattern formation. And the acquired digital data is inputted to the demultiplexer 438.

The demultiplexer 438 selects one of the LPF (low-pass filter) circuits 439, 440 and 441 (i.e., digital filter circuits having an integration operation function) provided for the respective sensor channels and outputs the converted digital data to the selected LPF circuit for the sensor channel concerned.

The LPF circuits 439, 440 and 441 cut off the high frequency components of the received data so as to allow the subsequently provided circuits to recognize the pattern positions more correctly. The edge detection circuits 442, 443 and 444 which are the subsequently provided circuits of the LPF circuits extract the falling and rising edges by comparing the detection voltage waveform with the predetermined threshold voltage, and recognize the center of the falling edge and the rising edge as being a pattern central point, so that the data of the pattern central points is stored in the register 434.

In accordance with the program stored in the ROM 446, the CPU 445 performs the change operation and the setting operation of the process conditions, and the change operation and the setting operation of the alignment conditions, while storing the data in the RAM 447, based on the data stored in the register 434. The setting operation is performed through the input/output interface 430 to the writing control unit and the print process unit. The input/output interface 430, the ROM 446, and the RAM 447 are interconnected by the address bus 448 and the data bus 449, respectively.

The CPU 445 changes the set value of the register 434 and causes the control circuits 433 and 437 to perform the switching of the sensor channel which performs sampling start/stop and A/D conversion. For example, when the set value of the register 434 is changed, the cut-off frequency of the LPF circuits 439, 440, and 441 is changed. Or when the set value of the register 434, a desired threshold voltage of the edge detection circuits 442, 443, and 444 is set up.

The data processing performed by the hardware in the alignment control is the integration data processing performed by the LPF circuits (the digital filter circuits) 439, 440, and 441 as shown in FIG. 4.

The sensor output voltage of the edge detection circuits 442, 443, and 444 (after A/D conversion and filtering) is compared with the threshold voltage is performed. The point where the sensor output voltage is less than the threshold voltage first is recognized as being the falling edge (the first pattern edge). The point where the sensor output voltage exceeds the threshold voltage next is recognized as being the rising edge (the second pattern edge). And the center of the falling edge and the rising edge is recognized as being the pattern central position.

Figure 5:
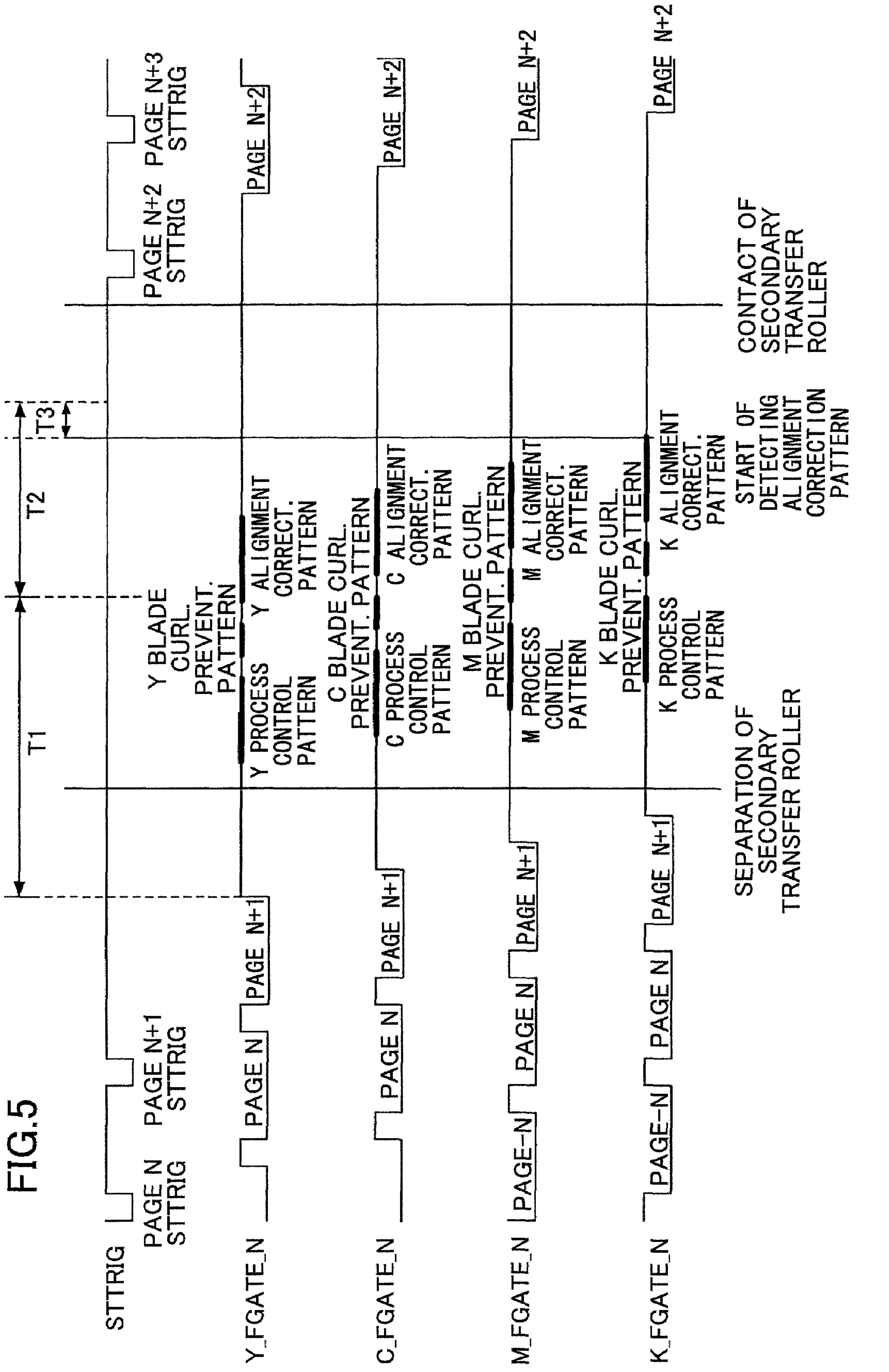
FIG. 5 is a timing chart for explaining the sub-scanning image formation operation.

FIG. 5 is a timing chart for explaining the sub-scanning image formation operation.

The timing holding unit 12 computes the time for each of a plurality of correction patterns including an alignment correction pattern to arrive at the correction pattern detection sensor from the exposure position, based on the distance and the image formation speed.

For example, the timing holding unit 12 computes the arrival time for the alignment correction pattern Y arrives at the alignment correction pattern detection sensor 126 from the exposure position to the photoconductor, in accordance with the following formula (1).

$$(\text{arrival time for alignment correction pattern})=(a1+b+c+d+e)/f \tag{1}$$

For example, the distance information and the image formation speed based on the composition of the image formation part 1 shown in FIG. 2 are set up as follows.

a1: the distance from Y exposure position 201 to Y intermediate transfer position 205=50 mm a2: the distance from C exposure position 202 to C intermediate transfer position 206=50 mm a3: the distance from M exposure position 203 to M intermediate transfer position 207=50 mm a4: the distance from K exposure position 204 to K intermediate transfer position 208=50 mm b: the distance from Y intermediate transfer position 205 to C intermediate transfer position 206=110 mm c: the distance from C intermediate transfer position 206 to M intermediate transfer position 207=110 mm d: the distance from M intermediate transfer position 207 to K intermediate transfer position 208=110 mm e: the distance to K intermediate transfer position 208 to the alignment correction pattern detection sensor position 209=105 mm f: the image formation speed (linear movement velocity of the photoconductor and the intermediate transfer belt)=205 mm/sec In this example, the alignment correction pattern detection is mainly explained. The computation of the detection start timing for starting the detection of the correction pattern according to the invention is not limited to that for the alignment correction pattern detection. Alternatively, it may be applicable to the computation of the detection start timing for each of the plurality of correction patterns formed on the intermediate transfer body.

FIG. 5 is a timing chart for explaining the sub-scanning image formation operation at the time of continuation printing in which images of page N, page N+1 and page N+2 are formed.

The sub-scanning image region signals Y_FGATE_N, C_FGATE_N, M_FGATE_N, and K_FGATE_N of the respective colors are sequentially set in active state, at the intervals of a given time equivalent to the time for the intermediate transfer belt 116 to move the distance between two of the respective photoconductors, so as to make the image formation possible. The FGATE signal of each color is created sequentially on the basis of a STTRIG signal.

In the alignment correction processing, as a result of the above-mentioned execution judgment processing, after printing of the image of page N is finished, it is determined whether various kinds of correction operation are performed.

The preparatory imaging operation of the process control pattern 340, the blade curling prevention pattern 360, and the alignment correction pattern 370 is performed when the FGATE signal is asserted for the image of page N+1. The preparatory imaging operation in this case includes the setting of gamma coefficients of each pattern and the setting of writing start time.

The image of page N+1 is transferred to the intermediate transfer belt, and it is transferred to the plain paper P by the secondary transfer roller. Thereafter, the secondary transfer roller is separated from the plain paper P.

The reason the secondary transfer roller is separated from the plain paper P is to prevent the pattern following the image of page N+1 from being transferred to the plain paper P by the secondary transfer roller.

In this example, the process control pattern 340, the blade curling prevention pattern 360, and the alignment correction pattern 370 are formed sequentially.

The imaging of process control pattern 340, blade curling prevention pattern 360, and alignment correction pattern 370 may be started before the secondary transfer roller is separated. However, it is desirable to start imaging of process control pattern 340, blade curling prevention pattern 360, and alignment correction pattern 370 after the separation of the secondary transfer roller, in order to avoid the influence of shock at the time of separation of the secondary transfer roller. This is because the shock, such as irregularity of the movement speed of the intermediate transfer belt, may sometimes occur at the time of separation of the secondary transfer roller.

The detection start timing T for starting detection of each of the plurality of correction patterns, including the alignment correction pattern, is computed based on the period T1 from the asserting time of the FGATE signal of page N+1 to the time of correction pattern imaging start, the arrival time T2 of the applicable correction pattern, and the detection start margin time T3 of the detection sensor unit 126, in accordance with the following formula:

$$\begin{aligned}(\text{detection start timing } T) = & \; (\text{period } T1 \text{ from the asserting time of } FGATE \text{ signal} \\ & \text{to the time of correction pattern imaging start}) + \\ & (\text{correction pattern arrival time } T2) - \\ & (\text{detection start margin time } T3)\end{aligned} \tag{2}$$

When computing the detection start timing of the Y alignment correction pattern, T1, T2, and T3 in the above formula (2) correspond to the times indicated by the arrows T1, T2, and T3 in the timing chart of FIG. 5, respectively.

When the image correction unit 10 receives a start command of the image formation operation correction processing, the sampling is started and detection of each of the plurality of correction patterns is started.

Termination of the detection of all the plurality of correction patterns depends on the detection results in the register.

The secondary transfer roller is made to contact the plain paper P and the imaging preparation of the image of page N+2 is started.

The timing holding unit 12 holds the detection start timing T computed by the above-mentioned formulas (1) and (2), in the memory of the RAM 447 as being the set value of detection start timing.

Specifically, the set value of detection start timing in this case is used as a set value of the start timing for starting the sampling detection of the plurality of correction patterns including the alignment correction pattern by the detection sensor unit 126.

The pattern detecting unit 13 detects the correction patterns, formed on the intermediate transfer belt 116 by the pattern creation unit 11, by using the detection sensor unit 126.

The speed detecting unit is constituted by the rotary encoder 280 or the like, and this speed detecting unit detects the movement speed at which the correction patterns formed on the intermediate transfer belt 116 are moved.

The image formation speed f which is the movement speed where this movement speed is usually applied to the photoconductor and the intermediate transfer belt 116 which are contained in the above-mentioned formula (1).

Based on the movement speed detected by the speed detecting unit and the set value of detection start timing held by the timing holding unit 12, the correction unit 14 determines detection start timing for starting the detecting operation of the pattern detecting unit 13 to detect each of the correction patterns formed on the intermediate transfer belt 116.

The correction unit 14 performs various kinds of correction to image formation operation of the image formation unit 1 based on the correction patterns detected by the pattern detecting unit 13.

Figure 6:
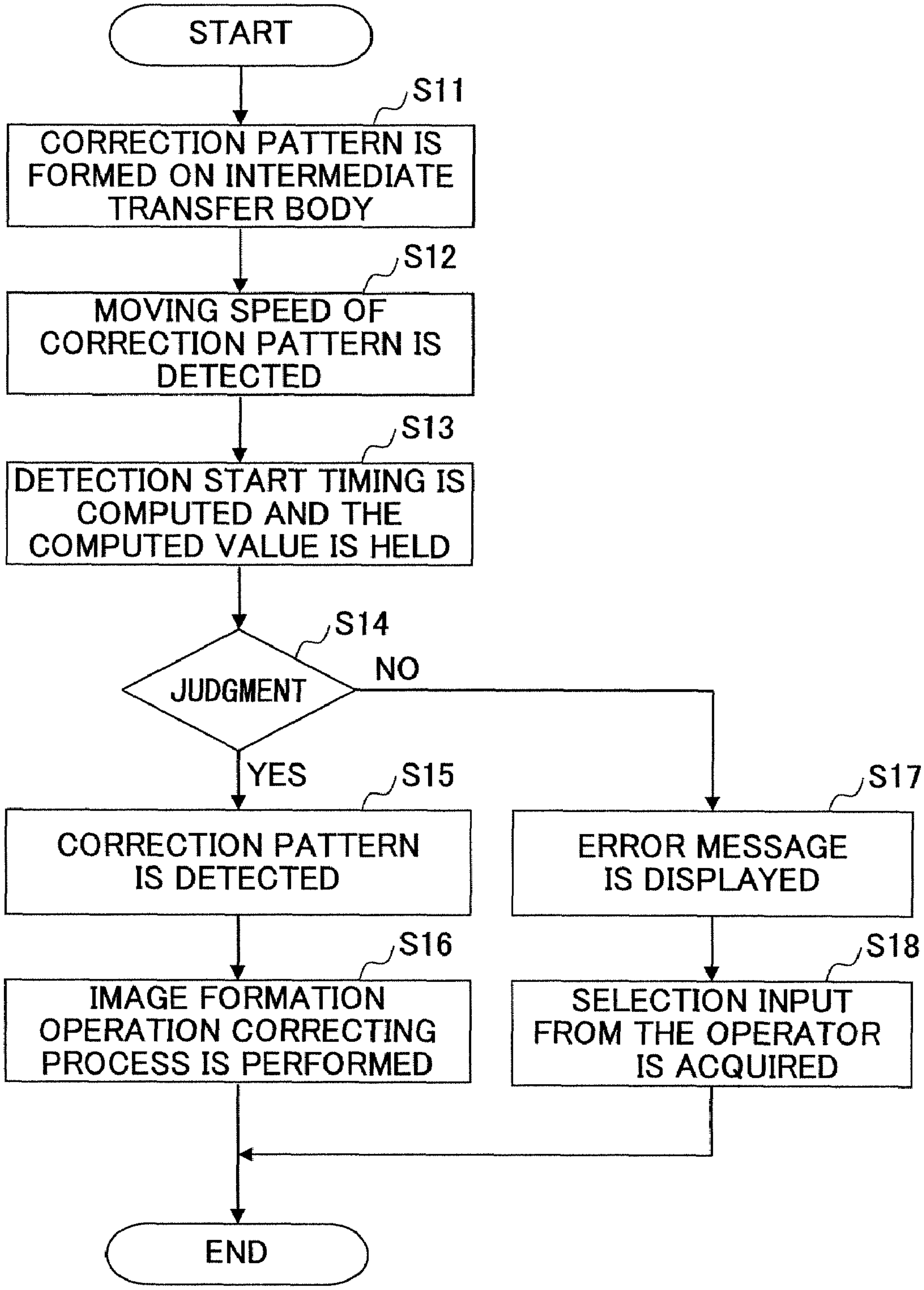
FIG. 6 is a flowchart for explaining the image formation operation correcting method in an embodiment of the invention.

FIG. 6 is a flowchart for explaining the image formation operation correcting method in an embodiment of the invention.

The pattern creation unit 11 forms a plurality of correction patterns on the intermediate transfer body by forming the electrostatic latent image of the plurality of correction patterns, including the alignment correction pattern, on the photoconductor, and transferring the image to the intermediate transfer body.

Namely, the laser unit 115 emits the laser beam to the photoconductor 110 in accordance with the image information of the correction patterns to form an electrostatic latent image of the correction patterns thereon. The correction patterns are formed on the intermediate transfer belt 116 when the developing unit 112 performs toner development for each color and transfers the correction patterns to the intermediate transfer belt 116 (step S11).

The rotary encoder 280 detects the movement speed at which the correction patterns formed on the intermediate transfer belt 116 are moved, and the correction unit 14 acquires the movement speed detected by the rotary encoder 280 (step S12).

The timing holding unit 12 reads a predetermined image formation speed f from the memory. Based on the distance information related to the composition of the image formation unit 1, the detection start timing for starting detection of each of the correction patterns including the alignment correction pattern is computed, and the computed value is held in the RAM 447 as a set value of the detection start timing of each correction pattern (step S13).

Computation of the detection start timing of each of the correction patterns can be performed using the above-mentioned formulas (1) and (2).

Next, the correction unit 14 compares the movement speed detected by the rotary encoder 280 and the predetermined image formation speed f read from the memory, and determines whether they are substantially the same (step S14). Namely, it is determined whether a difference between the two speeds is less than a predetermined reference value.

When it is determined at step S14 that the difference is less than the reference value, it can be judged that a deviation or fine adjustment of the mounting position of the detection sensor unit 126 does not arise (or a change in the image formation speed does not occur). In this case, the correction unit 14 finally determines that the set value held at the step S13 is exact detection start timing.

The pattern detecting unit 13 detects the correction patterns on the intermediate transfer belt 116 by using the detection sensor unit 126 in accordance with the set value of the detection start timing held at the step S13 (step S15).

Next, the correction unit 14 corrects the image formation operation based on the correction patterns detected by the pattern detecting unit 13. In this case, color gap correction processing, blade curling prevention processing, and process control correction processing are performed (step S16).

On the other hand, when it is determined at the step S14 that the detected movement speed and the predetermined image formation speed f read from the memory are not in agreement, it can be judged that a deviation or fine adjustment of the mounting position of the detection sensor unit 126 arises (or, a change in the image formation speed occurs). In this case, the pattern detecting unit 13 does not detect the correction patterns. The correction unit 14 outputs an error message (display information) which indicates that the detected movement speed and the image formation speed f are in agreement, to the operation panel (refer to the operation panel 2220 of FIG. 7). The correction unit 14 requests the operator to make the selection input (or, the necessity of updating the image formation speed f) on the operation panel (step S17).

Next, the correction unit 14 receives the selection input from the operator on the operation panel (step S18). When the selection input which indicates that the operator needs updating of the image formation speed f is received, the correction unit 14 further requests the operator to make the setting input (or, a new value of the image formation speed f by which the speed is changed) on the operation panel, and receives the setting input from the operator on the operation panel.

And the correction unit 14 terminates the processing after updating of the image formation speed f is performed by writing the new value of the image formation speed f to the predetermined area of the memory of the ROM 446.

On the other hand, when the selection input which indicates that the operator does not need updating of the image formation speed f is received at the step S18, the correction unit 14 terminates the processing without updating the image formation speed f.

As explained above, the timing holding unit 12 computes the set value of detection start timing based on the period from the time of start of forming the electrostatic latent image of a correction pattern on the photoconductor to the time of starting detection of the correction pattern on the actual intermediate transfer belt 116, and holds the computed set value. The correction unit 14 determines the detection start timing based on the movement speed of the correction pattern detected by the speed detecting unit and the set value held by the timing holding unit 12.

Therefore, according to the image forming device of the invention, the correction pattern can be correctly detected and the correction operation can be correctly performed even when detecting a plurality of correction patterns continuously formed on the intermediate transfer body. It is possible to form the output image with high quality.

In the image forming device of the invention, the pattern creation unit 11 may be configured to form the color gap correction patterns of a plurality of colors in the case of performing image formation in a plurality of colors as a plurality of correction patterns, the process control pattern which corrects control of the various processes in image formation, and the blade curling prevention pattern which corrects mechanical curling of the blade in the latent image formation unit.

The correction unit 14 determines the detection start timing based on the movement speed of the correction pattern detected by the speed detecting unit and the set value held by the timing holding unit 12. For this reason, when a color gap correction pattern, a process control pattern, a blade curling prevention pattern, etc. are continuously formed on the intermediate transfer belt 116, each correction pattern can be read correctly and each correction operation can be performed.

The correction unit 14 may be configured to acquire the setting input value of the image formation speed from the operator, and update the image formation speed by the acquired setting input value. For this reason, the detection value of the movement speed of the correction pattern by the speed detecting unit, and the set value of the image formation speed can be made in agreement after updating when a deviation or fine adjustment of the mounting position of the detection sensor unit 126 arises.

Each correction pattern can be read correctly and each correction operation can be performed. When performing image formation in a plurality of colors, the timing holding unit 12 may be configured to compute a set value of detection start timing for each of a plurality of correction patterns formed by forming a plurality of electrostatic latent images of the correction patterns on the photoconductor drums llOY-1lOK of the respective colors, and transferring them continuously to the intermediate transfer belt 116. Therefore, detection start timing can be correctly computed for each correction pattern.

The timing holding unit 12 may be configured to include a distance setting unit which acquires the setting input value of the distance information from the position where formation of the electrostatic latent image of the correction pattern on the photoconductor is started to the position where detection of the correction pattern by the pattern detecting unit is started. The timing holding unit 12 may be configured to compute the detection start timing based on the setting input value of the distance information acquired from the distance setting unit.

For example, the intermediate transfer belt 116 of the image forming device may be physically expanded by a temperature rise. Even when the distance from the formation starting position of the electrostatic latent image to the detection starting position of the correction pattern by the pattern detecting unit 13 changes, the detection start timing can be computed correctly based on the set value of the distance information acquired from the distance setting unit.

The timing holding unit 12 may be configured to include a distance setting unit which acquires the setting input value of the distance information of the image forming device which distance information is divided at the position where detection of the correction pattern by the pattern detecting unit is started, at the position where formation of the electrostatic latent image of the correction pattern on the photoconductor is started, and at the position where transferring of the electrostatic latent image of the correction pattern from the photoconductor to the intermediate transfer body is started, respectively. The timing holding unit 12 may be configured to compute the detection start timing based on the set value of the distance information acquired by the distance setting unit.

Even when the distance information of the image forming device changes physically, based on the set value of the distance information acquired by the distance setting unit, the detection start timing can be computed correctly.

The correction unit 14 may be configured to determine, before correcting the image formation operation based on the correction patterns, whether the movement speed detected by the speed detecting unit and the predetermined image formation speed are substantially the same. Based on the result of the judgment, the correction unit 14 can determine the detection start timing correctly.

Figure 7:
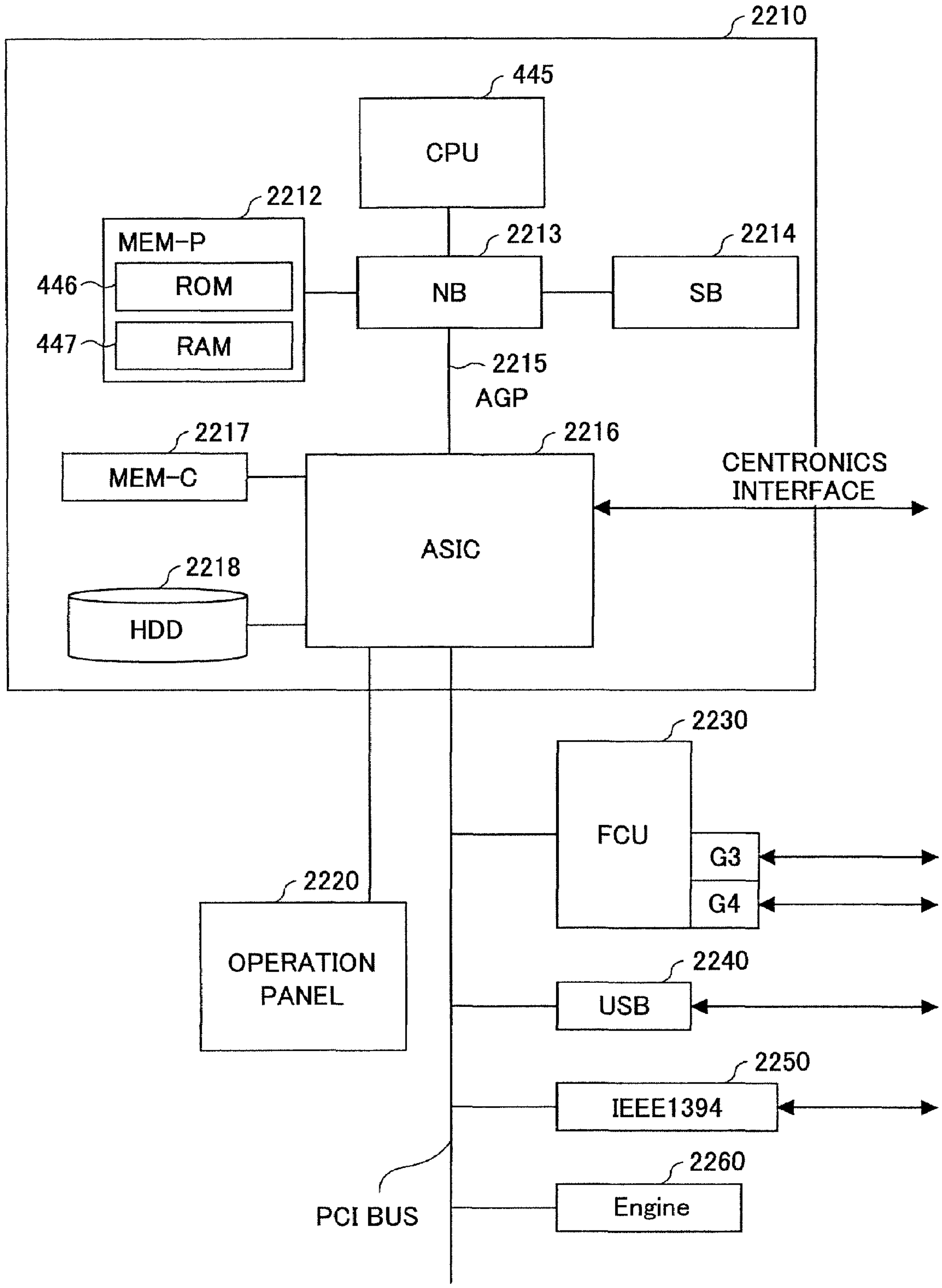
FIG. 7 is a block diagram showing the hardware composition of the image forming device in an embodiment of the invention.

FIG. 7 is a block diagram showing the hardware composition of the image forming device in an embodiment of the invention.

As shown in FIG. 7, this image forming device is constituted as a multi-function peripheral (MFP) which includes multiple image formation functions including a copy function, a fax function, a scanner function, etc.

As shown in FIG. 7, the MFP includes the controller 2210 and the engine unit 2260 which are connected together by the PCI (peripheral component interconnect) bus.

The controller 2210 controls the input from the operation panel 2220 and the FCU interface 2230, including the control of the whole MFP, the image display control, the various operational control, and the image-processing control.

The engine unit 2260 is an image-processing engine which is connectable with the PCI bus, and this engine unit 2260 performs image processing, such as error diffusion and gamma conversion, to the acquired image data.

The controller 2210 is provided with the CPU 445, the north bridge (NB) 2213, the system memory (MEM-P) 2212, the south bridge (SB) 2214, the local memory (MEM-C) 2217, the ASIC (application-specific integrated circuit) 2216, and the hard disk drive (HDD) 2218.

The controller 2210 has the composition in which the north bridge 2213 and the ASIC 2216 are connected by the AGP (accelerated graphics port) bus 2215. The MEM-P 2212 includes the ROM (read-only memory) 446 and the RAM (random access memory) 447.

The CPU 445 performs the control of the whole MFP, and the CPU 445 has the chip set which includes the NB 2213, the MEM-P 2212, and the SB 2214. The CPU 445 is connected with an external device through the chip set.

The NB 2213 is a bridge for connecting the CPU 445, the MEM-P 2212, the SB 2214, and the AGP 2215. This NB 2213 includes the memory controller (which controls the reading/writing to the MEM-P 2212), the PCI master, and the AGP target.

The MEM-P 2212 is a system memory which is used as the memory for storing of programs or data, or as the memory for deployment of programs and data. The MEM-P 2212 includes the ROM 446 and the RAM 447.

The ROM 446 is a read-only memory which is used as the memory for storing of programs or data. The RAM 447 is a rewritable memory which is used as the memory for deployment of programs or data, or as the image drawing memory used at the time of image processing.

The SB 2214 is a bridge for connecting the NB 2213, a PCI device and a peripheral device. This SB 2214 is connected with the NB 2213 via the PCI bus. The FCU interface 2230 is also connected to the PCI bus.

The ASIC 2216 is an IC for use in the multimedia information processing which includes the hardware element for multimedia information processing. The ASIC 2216 serves as the bridge for connecting the AGP 2215, the PCI bus, the HDD 2218, and the MEM-C 2217, respectively.

In the ASIC 2216, the PCI target and the AGP master, the arbiter as the core of the ASIC 2216, the memory controller controlling the MEM-C 2217, and a plurality of DMACs (direct memory access controllers) performing rotation of image data with the hardware logics, the USB (universal serial bus) interface 2240, and the IEEE1394 interface 2250 are connected via the PCI bus to the engine unit 2260.

The MEM-C 2217 is a local memory which is used as the image or code buffer for transmission. The HDD 2218 is a storage device in which accumulation of image data, accumulation of programs, accumulation of font data, and accumulation of forms are performed.

The AGP 2215 is the bus interface for graphics accelerator card which is proposed to accelerate graphic processing. The AGP 2215 has direct access to the MEM-P 2212 with high throughput, to make the graphics accelerator card a high-speed device.

The operation panel 2220 functions as the hardware (operation unit) for allowing the operator to perform the operational input to the multi-function peripheral (MFP), and functions as the hardware (display unit) for allowing the operator to get a display output from the MFP.

The operation panel 2220, which is connected to the ASIC 2216, receives the operational input from the operator, and transmits the received operational input to the ASIC 2216.

The operation panel 2220 receives the display information outputted from the ASIC 2216, outputs the received display information to the display monitor, and notifies the operator of the display information.

The image formation operation correcting program, which is executed by the MFP in which the image correction unit in an embodiment of the invention is incorporated, is stored beforehand in the ROM and is offered.

The image formation operation correcting program, which is executed by the MFP in which the image correction unit in an embodiment of the invention is incorporated, may be configured so that it is recorded on a computer-readable recording medium, such as CD-ROM, flexible disk (FD), CD-R, or DVD, in the form of a file or in the form in which the program is executable.

The image formation operation correcting program, which is executed by the MFP in which the image correction unit in an embodiment of the invention is incorporated, may be stored on the computer connected to the network, such as the Internet. And the program from the computer may be downloaded via the network to the image forming device.

The image formation operation correcting program, which is executed by the MFP in which the image correction unit in an embodiment of the invention is incorporated, may be supplied or distributed via the network, such as the Internet.

The image formation operation correcting program, which is executed by the MFP in which the image correction unit in an embodiment of the invention is incorporated, has the composition including the modules corresponding to the respective components (pattern creation unit 11, timing holding unit 12, pattern detecting unit 13, and correction unit 14) mentioned above.

When the CPU (processor) reads and executes the image processing program from the above-mentioned ROM as the actual hardware, the respective components of the above program are loaded on the main storage, so that the pattern creation unit 11, the timing holding unit 12, the pattern detecting unit 13, the correction unit 14, etc. are created on the main storage.

The present invention is not limited to the above-described embodiments, and variations and modifications may be made without departing from the scope of the present invention.

Further, the present application is based on and claims the benefit of priority of Japanese patent application No. 2005-346353, filed on Nov. 30, 2005, and Japanese patent application No. 2006-298260, filed on Nov. 1, 2006, the entire contents of which are hereby incorporated by reference.

What is claimed is:

1. An image forming device which transfers a developed electrostatic latent image formed on a photoconductor according to input image information, to an intermediate transfer body, and forms an output image, the image forming device comprising:

a correction unit configured to correct an image formation operation based on a plurality of correction patterns:

a pattern creation unit configured to form a developed electrostatic latent image of the correction patterns on the photoconductor and to transfer the developed electrostatic latent image of the correction patterns, to the intermediate transfer body to form the correction patterns thereon;

a pattern detecting unit configured to detect the correction patterns formed on the intermediate transfer body by the pattern creation unit;

a speed detecting unit configured to detect a movement speed at which the correction patterns formed on the intermediate transfer body are moved; and a timing holding unit configured to compute a set value of detection start timing for starting detection of each of the correction patterns by the pattern detecting unit, to hold the computed set value, wherein the correction unit is configured to determine, in advance of correcting the image formation operation based on the correction patterns, a detection start timing based on the movement speed detected by the speed detecting unit and the set value held by the timing holding unit.

2. The image forming device according to claim 1, wherein the pattern creation unit is configured to form the plurality of correction patterns on the intermediate transfer body, the plurality of correction patterns including an alignment correction pattern used to correct color gaps of a plurality of colors in performing color image formation, a process control pattern used to correct image formation process control, and a blade curling prevention pattern used to correct mechanical curling of a blade for cleaning the photoconductor.

3. The image forming device according to claim 1, wherein the timing holding unit is configured to compute the set value of detection start timing based on a period from an asserting time of a sub-scanning image region signal to a time of correction pattern imaging start, an arrival time of a correction pattern to arrive at the pattern detecting unit, and a detection start margin time of the pattern detecting unit.

4. The image forming device according to claim 3, wherein the timing holding unit is configured to compute the set value of detection start timing in accordance with the formula: $T=(T1+T2)-T3$ where T denotes the set value of detection start timing, T1 denotes the period from the asserting time of the sub-scanning image region signal to the time of correction pattern imaging start, T2 denotes the arrival time of the correction pattern to arrive at the pattern detecting unit, and T3 denotes the detection start margin time of the pattern detecting unit.

5. The image forming device according to claim 1, wherein the timing holding unit is configured to compute an arrival time of a correction pattern to arrive at a position of the pattern detecting unit from a time of correction pattern imaging start, based on distance information and an image formation speed of the image forming device.

6. The image forming device according to claim 1, wherein the correction unit is configured to receive a setting input value of an image formation speed from an operator, and to update the image formation speed of the image forming device by the received setting input value.

7. The image forming device according to claim 1, wherein, when performing color image formation by a plurality of colors, the timing holding unit is configured to compute the set value of detection start timing for each of the correction patterns which are formed through formation of respective developed electrostatic latent images of the correction patterns on a plurality of photoconductors of the respective colors and continuous transferring of the images to the intermediate transfer body.

8. The image forming device according to claim 1, wherein the timing holding unit is provided to include a distance setting unit which acquires a setting input value of distance information from a position where formation of the developed electrostatic latent image of the correction patterns on the photoconductor is started to a position where detection of the correction pattern by the pattern detecting unit is started, and the timing holding unit is configured to compute a detection start timing based on the setting input value of distance information received from the distance setting unit.

9. The image forming device according to claim 1, wherein the timing holding unit is provided to include a distance setting unit which acquires a setting input value of distance information of the image forming device which is divided at a position where formation of the developed electrostatic latent image on the photoconductor is started, a position where transferring of the developed electrostatic latent image from the photoconductor to the intermediate transfer body is started, and a position where detection of a correction pattern by the pattern detecting unit is started, respectively, and the timing holding unit is configured to compute a detection start timing based on the setting input value of distance information received from the distance setting unit.

10. The image forming device according to claim 1, wherein the correction unit is configured to determine, in advance of correcting the image formation operation based on the correction patterns, whether a difference between the movement speed detected by the speed detecting unit and a predetermined image formation speed is less than a predetermined reference value.

11. An image formation operation correcting method which corrects image formation operation of an image forming device which transfers a developed electrostatic latent image formed on a photoconductor according to input image information, to an intermediate transfer body, and forms an output image, the image formation operation correcting method comprising the steps of:

correcting image formation operation based on a plurality of correction patterns;

forming a developed electrostatic latent image of the correction patterns on the photoconductor and transferring the developed electrostatic latent image, to the intermediate transfer body to form the correction patterns thereon;

detecting the correction patterns formed on the intermediate transfer body;

detecting a movement speed at which the correction patterns formed on the intermediate transfer body are moved; and computing a set value of detection start timing for starting detection of each of the correction patterns in the detecting step, to hold the computed set value, wherein, in advance of correcting the image formation operation based on the correction patterns, a detection start timing is determined based on the movement speed and the set value.

12. The image formation operation correcting method according to claim 11, wherein the plurality of correction patterns, formed on the intermediate transfer body, include an alignment correction pattern used to correct color gaps of a plurality of colors in performing color image formation, a process control pattern used to correct image formation process control, and a blade curling prevention pattern used to correct mechanical curling of a blade for cleaning the photoconductor.

13. A computer-readable recording medium having a program stored thereon which, when executed by a computer, causes the computer to perform an image formation operation correcting method according to claim 11.

* * * * *